(12) United States Patent
Young et al.

(10) Patent No.: US 7,809,143 B2
(45) Date of Patent: Oct. 5, 2010

(54) QKD SYSTEM WITH SYNCHRONIZATION CHANNEL VERIFICATION

(75) Inventors: Jonathan Young, Newburyport, MA (US); Harry Vig, North Billerica, MA (US); J. Howell Mitchell, Jr., Amherst, NH (US)

(73) Assignee: Magiq Technologies, Inc., Somerville, MA (US)

( * ) Notice: Subject to any disclaimer, the term of this patent is extended or adjusted under 35 U.S.C. 154(b) by 1068 days.

(21) Appl. No.: 11/257,173

(22) Filed: Oct. 24, 2005

(65) Prior Publication Data

US 2007/0092083 A1    Apr. 26, 2007

(51) Int. Cl.
*H04L 9/00* (2006.01)
(52) U.S. Cl. .................. 380/278; 380/46; 380/253; 380/256; 713/171
(58) Field of Classification Search ............ 380/46, 380/253, 256; 713/171
See application file for complete search history.

(56) References Cited

U.S. PATENT DOCUMENTS

| | | | |
|---|---|---|---|
| 3,760,354 A | 9/1973 | Ginn | |
| 4,071,692 A | 1/1978 | Weir et al. | |
| 4,920,537 A | 4/1990 | Darling et al. | |
| 5,138,616 A | 8/1992 | Wagner et al. | |
| 5,515,438 A | 5/1996 | Bennett et al. | |
| 5,757,912 A * | 5/1998 | Blow | 380/256 |
| 6,272,224 B1 * | 8/2001 | Mazourenko et al. | 380/283 |
| 7,359,512 B1 * | 4/2008 | Elliott | 380/253 |
| 2005/0157875 A1 * | 7/2005 | Nishioka et al. | 380/46 |
| 2005/0259825 A1 * | 11/2005 | Trifonov | 380/277 |
| 2006/0059343 A1 * | 3/2006 | Berzanskis et al. | 713/171 |

FOREIGN PATENT DOCUMENTS

WO    WO2004073235    * 8/2004

OTHER PUBLICATIONS

MagiQ, Unlocking the Benefits of Quantum Information Processing, Oct. 2004, pp. 1-2.*

* cited by examiner

*Primary Examiner*—Nasser Moazzami
*Assistant Examiner*—Ghazal Shehni

(57) ABSTRACT

Systems and methods for verifying error-free transmission of the synchronization ("sync") channel of a QKD system are disclosed. The method includes sending a first pseudo-random bit stream (PRBS) over the sync channel from Alice to Bob, and verifying at Bob the accurate transmission of the first PRBS. The method also includes sending a second pseudo-random bit stream (PRBS) over the sync channel from Bob to Alice, and verifying at Alice the accurate transmission of the first PRBS. If the transmissions of a select number of bits in the first and second PRBSs are error-free, then the sync channel is verified and the QKD system can commence operation.

20 Claims, 5 Drawing Sheets

QKD SYSTEM WITH SYNCHRONIZATION CHANNEL VERIFICATION

FIELD OF THE INVENTION

The present invention relates to quantum cryptography, and in particular relates to quantum key distribution (QKD) systems, and more particularly relates to synchronizing the operation of a QKD system.

BACKGROUND OF THE INVENTION

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," IEEE Proceedings of the International Conference on Computers, Systems and Signal Processing, Bangalore, India, Dec. 10-12, 1984, pp. 175-179. Specific QKD systems are described in the publication by C. H. Bennett et al., entitled "Experimental Quantum Cryptography," J. Cryptology 5: 3-28 (1992), in the publication by C. H. Bennett, entitled "Quantum Cryptography Using Any Two Non-Orthogonal States", Phys. Rev. Lett. 68 3121 (1992), and in U.S. Pat. No. 5,307,410 to Bennett (the '410 patent). The general process for performing QKD is described in the book by Bouwmeester et al., "The Physics of Quantum Information," Springer-Verlag 2001, in Section 2.3, pages 27-33.

The Bennett-Brassard article and the '410 patent each describe a so-called "one-way" QKD system wherein Alice randomly encodes the polarization of single photons, and Bob randomly measures the polarization of the photons. The one-way system described in the '410 patent is based on a two-part optical fiber Mach-Zehnder interferometer. Respective parts of the interferometer are accessible by Alice and Bob so that each can control the phase of the interferometer. The signals (pulses) sent from Alice to Bob are time-multiplexed and follow different paths. As a consequence, the interferometers need to be actively stabilized during transmission to compensate for thermal drifts. This is generally inconvenient for practical applications involving transmission distances measured in kilometers.

U.S. Pat. No. 6,438,234 to Gisin (the '234 patent'), which patent is incorporated herein by reference, discloses a so-called "two-way" QKD system that employs an autocompensating interferometer of the type invented by Dr. Joachim Meier of Germany and published in 1995 (in German) as "Stabile Interferometrie des nichtlinearen Brechzahl-Koeffizienten von Quarzglasfasern der optischen Nachrichtentechnik," Joachim Meier.—Als Ms. gedr.—Düsseldorf: VDI-Verl., Nr. 443, 1995 (ISBN 3-18-344308-2). Because the Meier interferometer is autocompensated for polarization and thermal variations, the two-way QKD system based thereon is generally less susceptible to environmental effects than a one-way system.

All QKD systems, regardless of type, require some form of synchronization in order for the system to operate. For example, the activation of various components of the systems, such as the modulators and the detectors, all need to be timed (and gated) relative to the expected arrival times of the quantum signals (photons). The sync signals are also used to establish "qubit buffers" having a length corresponding to a certain number of transmitted qubits (e.g., $10^4$ qubits). Accordingly, the QKD stations Alice and Bob are operatively coupled via a synchronization ("sync") channel and exchange sync signals over the sync channel.

The sync signal typically has an associated sync signal frame (interval) that, as mentioned above, defines the size of the qubit buffer. In the operation of the QKD system, it is critical that the sync signal interval be kept constant (i.e., error-free) so that the qubit buffers align. In this regard, some QKD systems rely on the use of phase-lock loops (PLLs) to re-clock the sync signal to reduce sync signal errors. Sync signal errors can arise due to a number of reasons, such as too much attenuation of the quantum signal, a bad optical fiber coupling, sideband interference, or a malfunction of a component in either of the two QKD stations.

While conventional communications systems can perform error correction on the sync signals, such correction cannot be performed in a QKD system because a single error in the sync channel signal results in a misalignment of the qubit buffers, which in turn leads to a dramatic increase in the qubit error rate (QBER). In particular, if one of the first bits in the sync channel is missed, and almost all of the sync signal frame is misaligned, a 50% QBER will result. If a single sync signal is missed is near the middle of the frame, the error rate will be at least 25%. This situation makes it impossible to discriminate between an eavesdropper or a missed sync signal, which in effect makes it impossible to exchange keys.

SUMMARY OF THE INVENTION

A pseudo-random bit sequence (PRBS) is passed between two stations of a QKD system, Bob and Alice, to validate the capability of the communications channel to transmit error-free synchronization pulses before the QKD system is operated to exchange keys. In one example, a different PRBS is transmitted from each station to the other so that each QKD station receiver can differentiate between receipt of the PRBS signal from the other QKD station and the receipt of a reflection of its own PRBS signal.

Thus, a first aspect of the invention is a method of verifying a synchronization ("sync") channel that operably connects two QKD stations—Alice and Bob—in a QKD system. The method includes transmitting a first pseudo-random bit stream (PRBS-A) from Alice to Bob over the sync channel and verifying at Bob the error-free reception of a first select number of bits in PRBS-A. The method also includes transmitting a second pseudo-random bit stream (PRBS-B) from Bob to Alice over the sync channel, and verifying at Alice the error-free reception of a second select number of bits in PRBS-B. Reception at each QKD station of a sufficiently large number of bits (e.g., $10^4$ bits) indicates that the sync channel is essentially error-free and ready for the transmission of sync signals.

Figure 1:
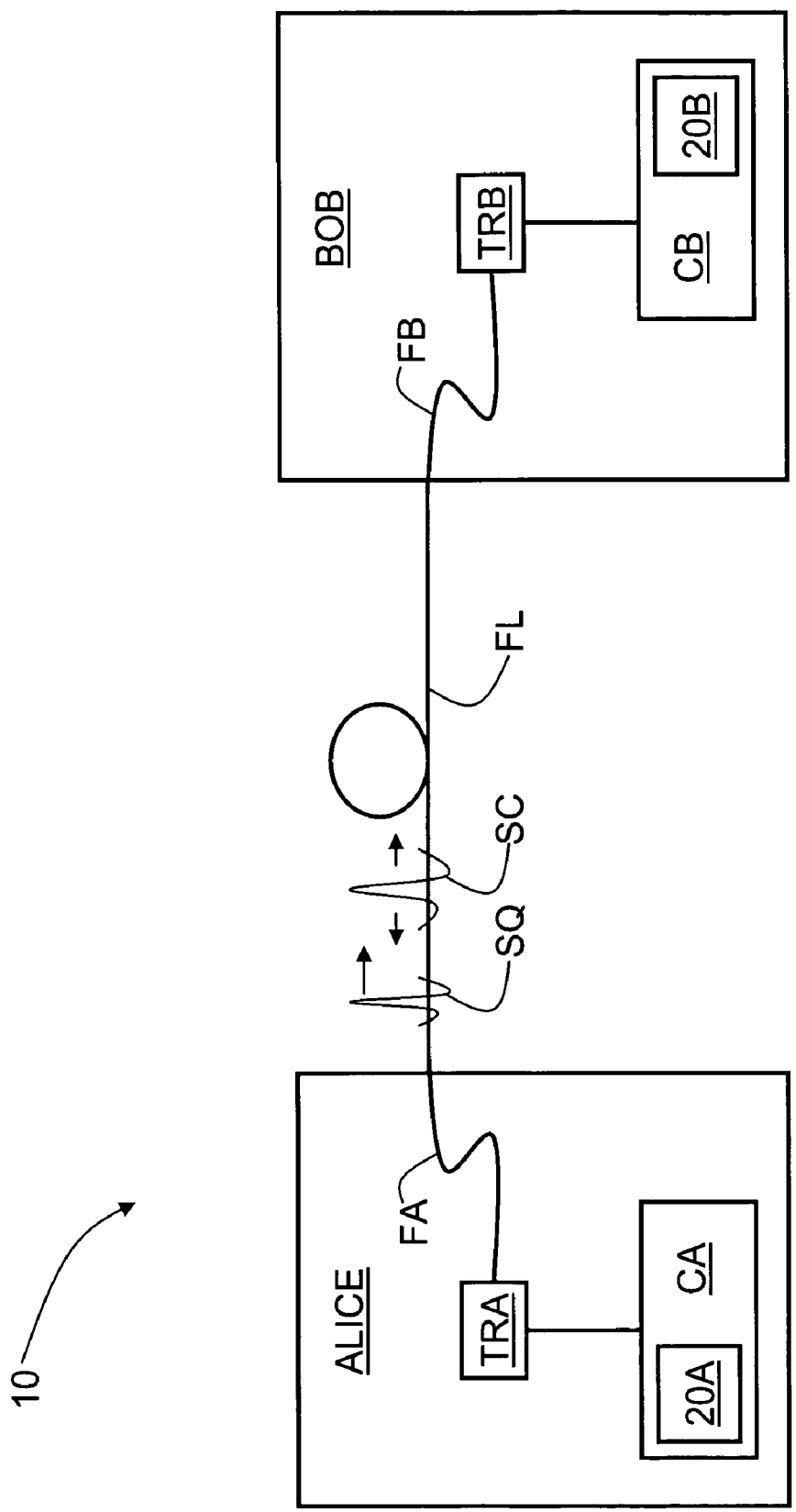
FIG. 1 is a schematic diagram of an example embodiment of a generalized QKD system according to the present invention, showing the elements that constitute the sync channel, and showing both the quantum signal (SQ) and the sync signal (SC) traveling over the optical fiber link connecting the two QKD stations Bob and Alice.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

In the Figures, like elements are identified by like reference numbers.

DETAILED DESCRIPTION OF THE INVENTION

FIG. 1 is a schematic diagram of a generalized example embodiment of a QKD system 10 according to the present invention. For the sake of illustration, only the elements relevant to the present invention—namely, those that constitute the sync channel SC—are shown in QKD system 10.

QKD system 10 includes two QKD stations Alice and Bob operably coupled by an optical fiber link FL. In an example embodiment, optical fiber link FL carries both the quantum channel (quantum signal SQ) and the sync channel (sync signal SC). Alice and Bob respectively include programmable controllers CA and CB that control the operation of the elements in their respective QKD stations, as well as control the overall operation, including synchronization, of QKD system 10. Controllers CA and CB include, for example, respective field-programmable gate arrays (FPGAs) 20A and 20B that are programmed to carry out the synchronization protocols, including the sync channel verification protocol described below. In particular, controllers CA and CB are programmed to generated respective pseudo-random bit streams (PRBSs). Also, each controller is programmed with the other's PRBS sequence so that it can receive the PRBS from the other controller and verify the successful reception of each bit in the received PRBS.

Alice and Bob also each include respective transmitter/receivers (abbreviated hereinafter as "T/R")) TRA and TRB that are electrically connected to respective controllers CA and CB. T/Rs TRA and TRB are adapted to receive an electrical signal and generate therefrom a corresponding optical signal, and vice versa. T/Rs TRA and TRB are each optically coupled to one end of optical fiber link FL via respective optical fiber sections FA and FB.

Method of Operation

Figure 2:
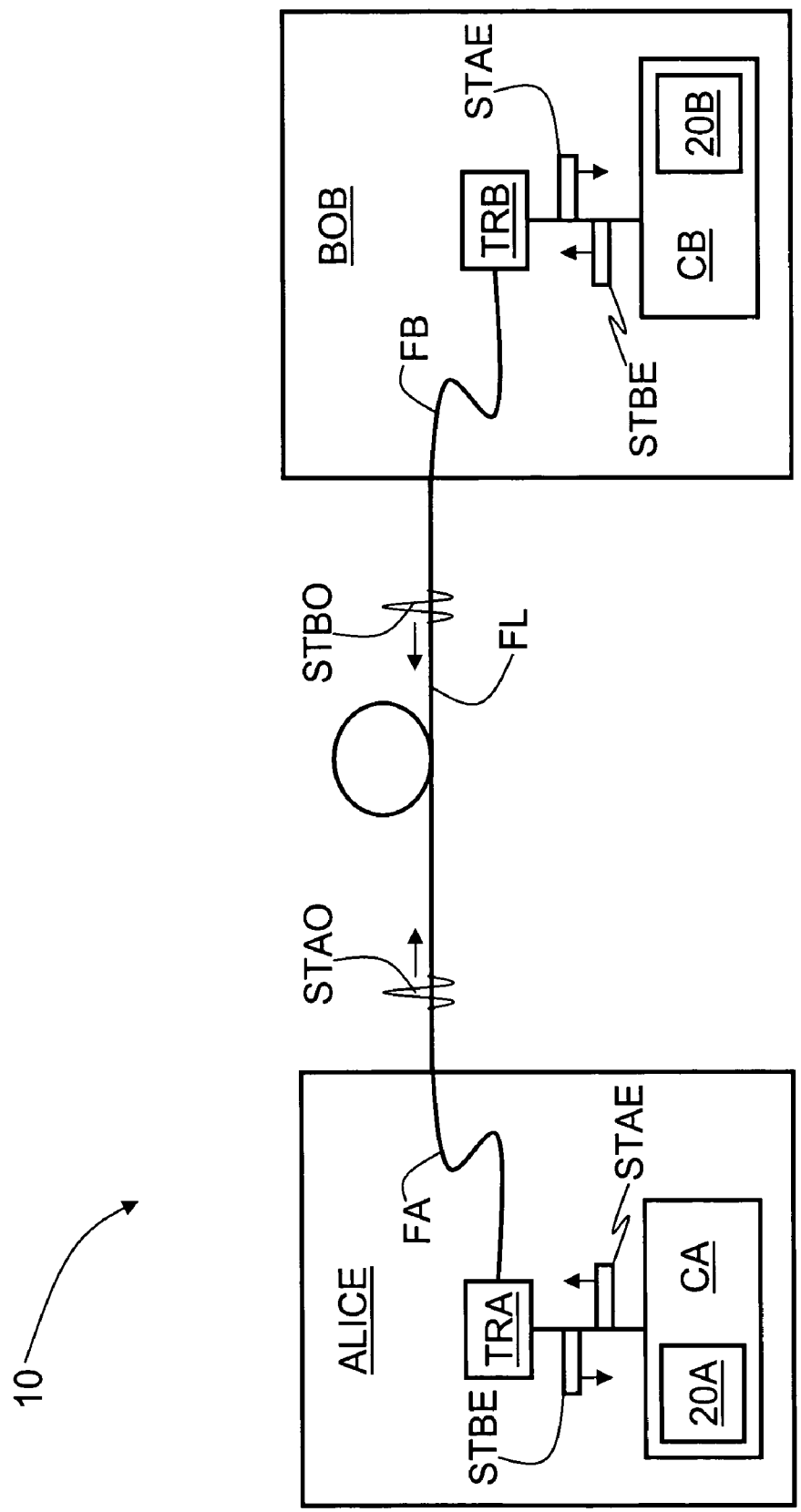
FIG. 2 is the QKD system of FIG. 1, showing the test signals STAO and STBO respectively generated by Alice and Bob's controllers and used to establish initial contact between Alice and Bob over the sync channel.

The method of the present invention is directed to verifying that the sync channel is free from transmission errors in both directions. With reference now to FIG. 2, in the operation of QKD system 10, controllers CA and CB first establish the ability to transmit and receive sync signals over the sync channel. This is done, for example, by one of the controllers—say controller CA—generating an electrical test signal STAE, which is converted to an optical test signal STAO by T/R TRA, which is received by T/R TRB at Bob. T/R TRB converts the optical test signal back to the electrical test signal STAE, which is received by Bob. The procedure is repeated in reverse from Bob to Alice using electrical signal STBE and optical signal STBO to establish two-way communication over the sync channel.

Figure 3:
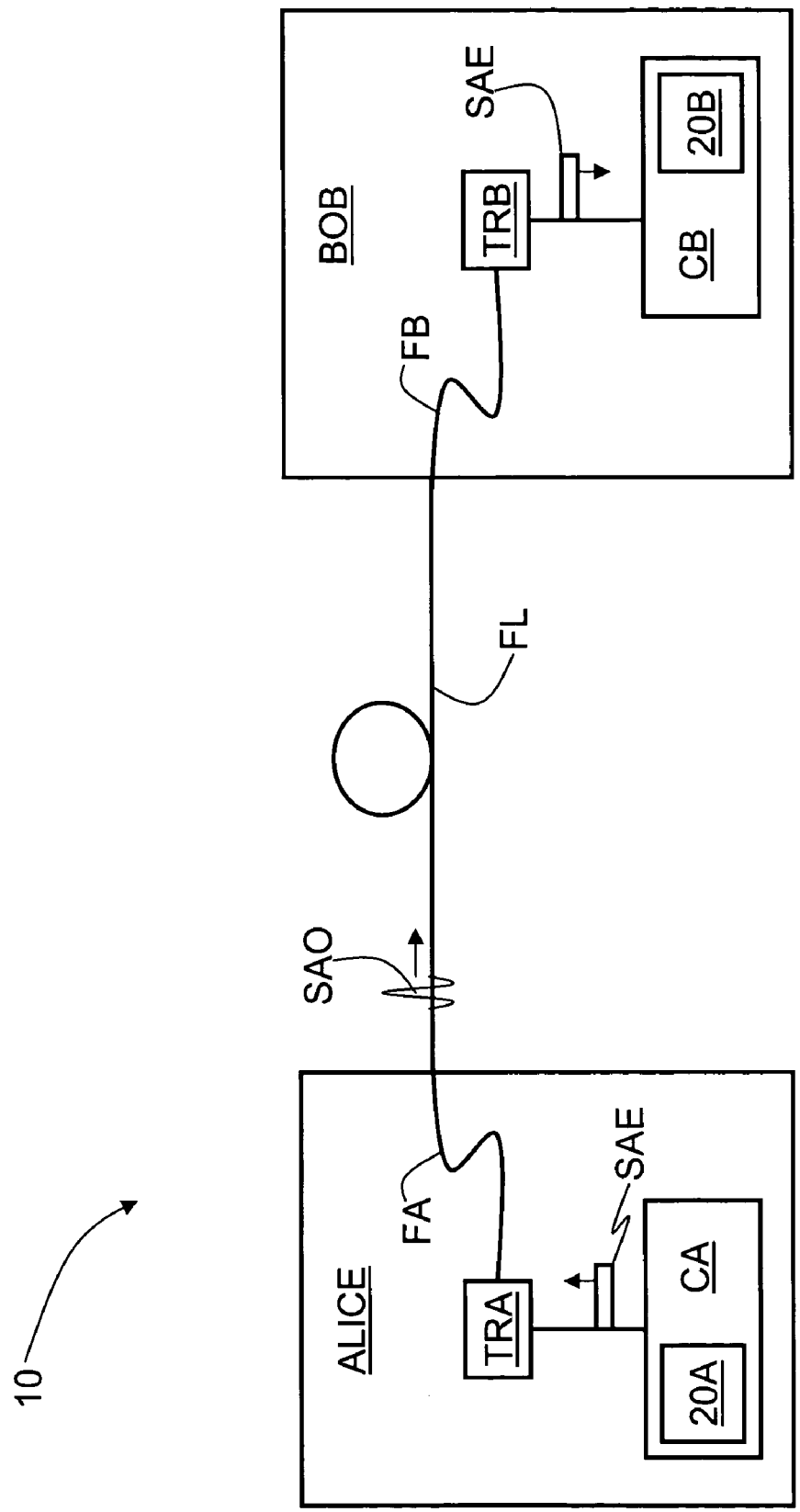
FIG. 3 is the QKD system of FIG. 1, showing Alice sending her PRBS (PRBS-A) over to Bob to verify that the sync channel transmission is free from errors in a first direction.

Once communication between Alice and Bob over the sync channel is established, then Alice transmits her PRBS—called PRBS-A—to Bob over the sync channel. With reference now to FIG. 3, this is done by controller CA generating electrical signals SAE that carry the bits of PRBS-A. Electrical signals SAE are received by T/R TRA and are converted to optical signals SAO that travel over optical fiber link FL to Bob. At Bob, signals SAO are received by T/R TRB and are converted back into electrical signals SAE, which are received by Bob's controller CB. As mentioned above, controller CB is programmed with PRBS-A, so that Bob syncs to PRBS-A and starts comparing the received bits to the actual PRBS-A.

Alice continues to send PRBS-A (looping through the stream multiple times, if necessary) until Bob receives a large number of bits (say, $10^7$ to $10^9$ bits) without an error. This establishes the baseline accuracy of the sync signal transmission. If the frame size of the sync signal is $10^4$ qubits, for example, then the chance of a sync signal error is $10^{-5}$, which is an acceptable Sync Channel Error Rate (SCER).

If Bob cannot receive a large number of bits in PRBS-A without error, he generates an error signal alerting the QKD system user(s) to this fact. The QKD system user(s) can then diagnose the problem occurring in the sync channel.

Figure 4:
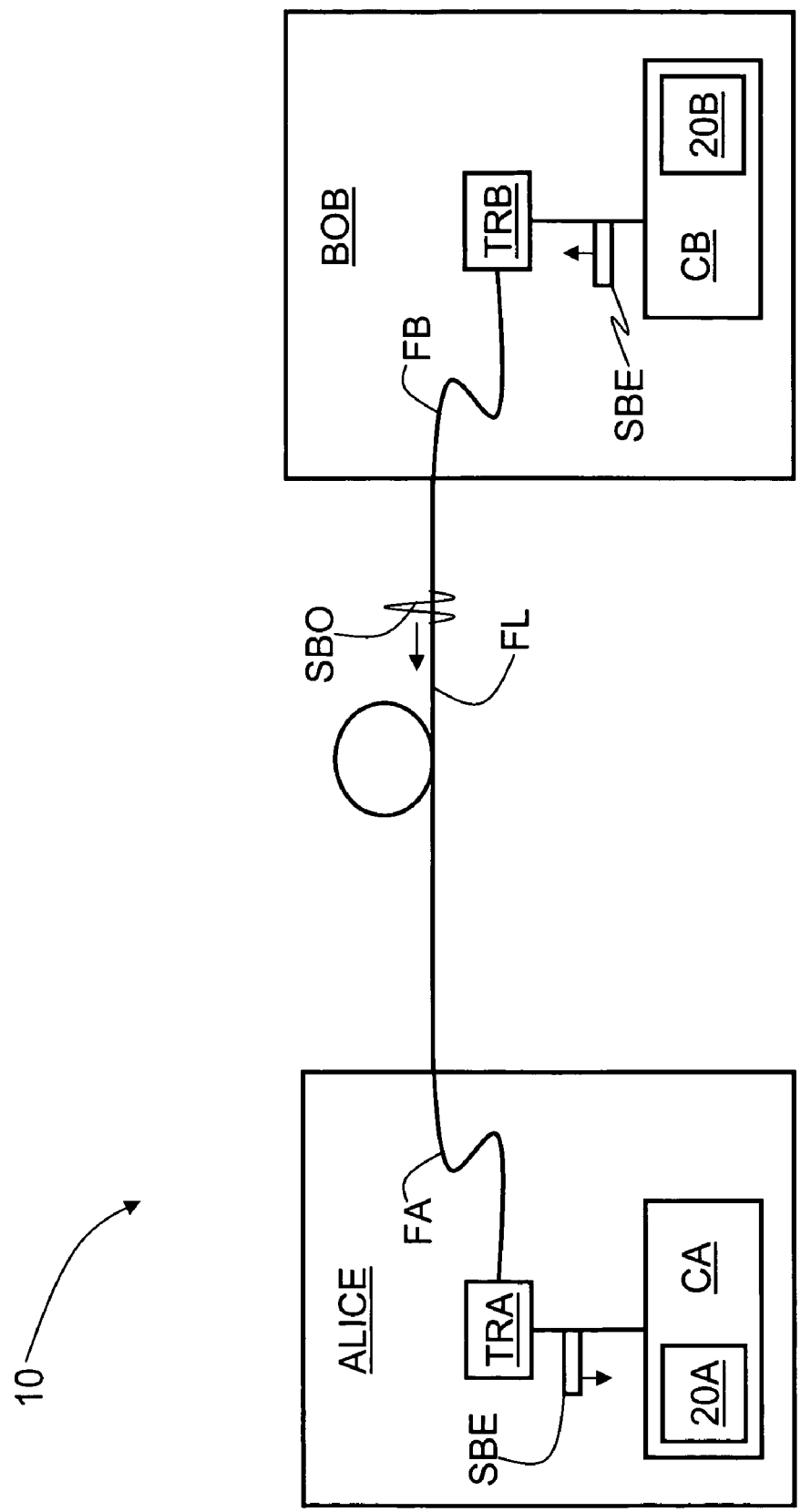
FIG. 4 is similar to FIG. 3, but showing Bob sending his PRBS (PRBS-B) to Alice to verify that the sync channel transmission is free from errors in the second direction.

With reference now to FIG. 4, if Bob received an accurate transmission—i.e., a sufficient number of bits in PRBS-A without an error—he then transmits his PRBS (called PRBS-B) and sends it to Alice by the reverse process via electrical signals SBE and optical signal SBOs. Note that PRBS-A need not be different than PRBS-A, and in an example embodiment are the same. An advantage of having PRBS-A different from PRBS-B is that each QKD station can better differentiate between receiving the PRBS signal sent from the other station and its own reflected PRBS signal.

Upon receiving the initial bit in PRBS-B from Bob, Alice terminates transmitting PRBS-A, syncs to Bob's PRBS-B and starts comparing the bits she receives to the actual PRBS-B she has stored in controller CA. If Alice cannot receive a large number of bits in PRBS-B without error, she generates an error signal alerting the QKD system user(s) to this fact. The QKD system user(s) can then diagnose the problem occurring in the sync channel.

Figure 5:
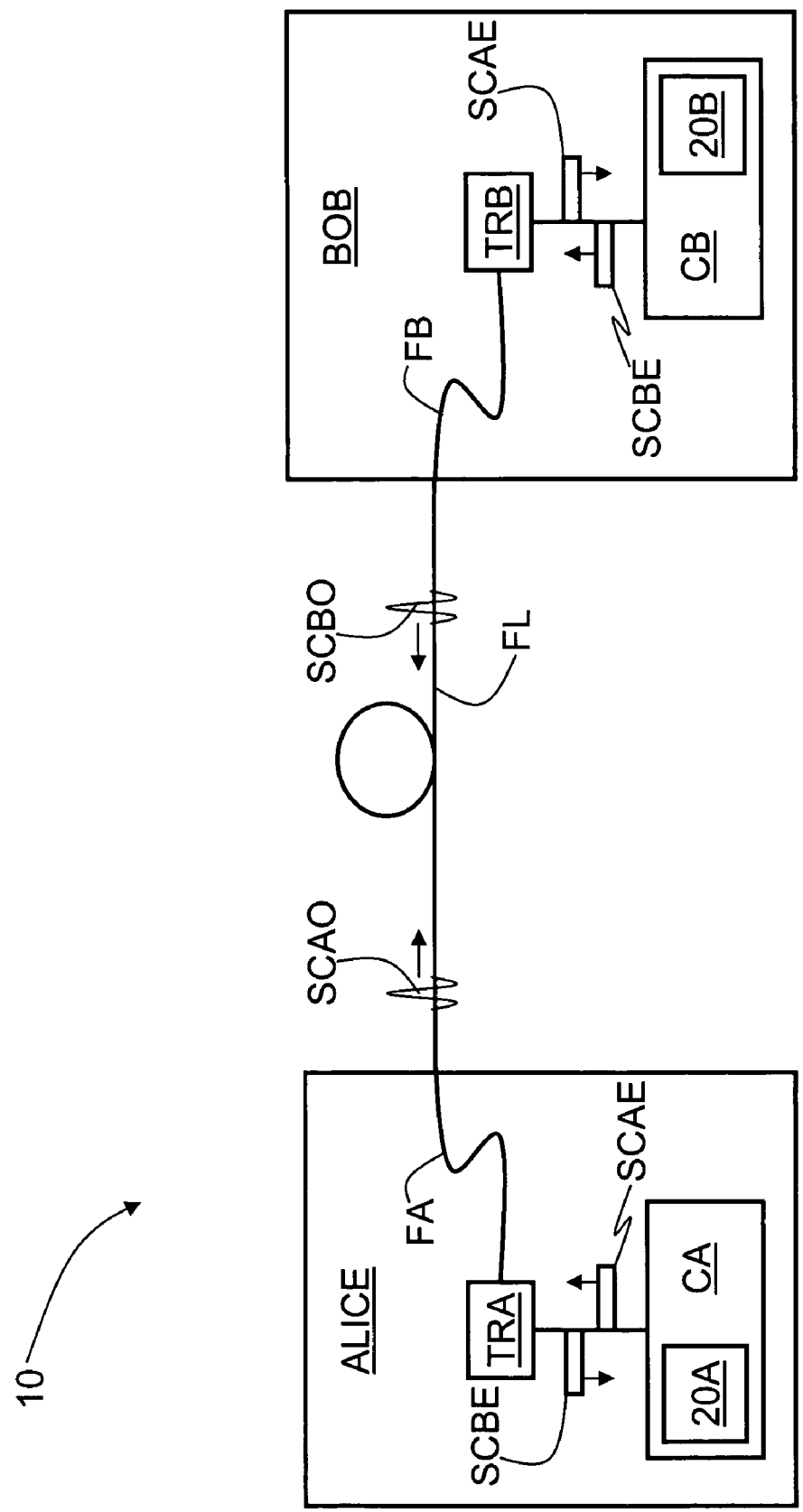
FIG. 5 is the QKD system of FIG. 1, showing transmission of sync signals between Alice and Bob in both directions after the sync channel verification has been performed in both directions.

If Alice received an accurate transmission—i.e., a sufficient number of bits in PRBS-B without an error—then she generates a status signal that informs the user of the QKD system that the sync channel communication is verified in both directions as being free from errors. At this point, with reference to FIG. 5, Alice and Bob can initiate the synchronization protocol using the appropriate sync signals (e.g., electrical sync signals SCAE, SCBE and corresponding optical sync signals SCAO, SCBO) over the sync channel. The QKD system can thus commence operation.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. In a quantum key distribution (QKD) system having first and second QKD stations Alice and Bob, a method of verifying a synchronization ("sync") channel that operably connects Alice and Bob, the method comprising:
- transmitting a first pseudo-random bit stream (PRBS-A) from Alice to Bob over the sync channel;
- verifying at Bob an error-free reception of a first select number of bits in PRBS-A;
- transmitting a second pseudo-random bit stream (PRBS-B) from Bob to Alice over the sync channel; and
- verifying at Alice an error-free reception of a second select number of bits in PRBS-B.

2. The method of claim 1, including transmitting PRBS-A and PRBS-B over an optical fiber link that optically connects Alice to Bob.

3. The method of claim 1, including converting PRBS-A and PRBS-B from an electrical signal to an optical signal.

4. The method of claim 1, wherein the first select number of bits is the same as the second select number of bits.

5. The method of claim 1, wherein the first and second select number of bits is in the range between $10^7$ and $10^9$ bits.

6. The method of claim 1, wherein Alice and Bob include respective controllers CA and CB, and including:
- storing PRBS-B in controller CA and storing PRBS-A in controller CB;
- wherein said verifying at Bob includes comparing received PRBS-A bits sent by Alice to corresponding stored PRBS-A bits; and
- wherein said verifying at Alice includes comparing received PRBS-B bits sent by Bob to corresponding stored PRBS-B bits.

7. The method of claim 1, wherein PRBS-A and PRBS-B are generated at Alice and Bob by respective field-programmable gate arrays.

8. The method of claim 1, wherein prior to transmitting a first pseudo-random bit stream (PRBS-A) from Alice to Bob over the sync channel, including establishing an ability to transmit and receive sync signals over the sync channel by:
- generating a first electrical signal at Alice;
- converting the first electrical signal to an optical signal at Alice;
- receiving the optical signal at Bob; and
- converting the optical signal to a second electrical signal at Bob.

9. The method of claim 1, wherein transmitting the first pseudo-random bit stream (PRBS-A) from Alice to Bob over the sync channel includes:
- generating first electrical signals at Alice that carry the bits in PRBS-A;
- converting the first electrical signals to optical signals at Alice;
- receiving the optical signals at Bob; and
- converting the optical signals to second electrical signals at Bob.

10. The method of claim 1, further comprising establishing a sync channel error rate.

11. The method of claim 10, further comprising generating an error signal if an acceptable sync channel error rate is not achieved.

12. A quantum key distribution (QKD) system comprising:
- first and second QKD stations Bob and Alice operably coupled by a synchronization ("sync") channel used for transmitting sync signals and by a quantum channel used for transmitting quantum signals;
- a controller CA at Alice adapted to generate a first pseudo-random bit stream PRBS-A and send it over to Bob via the sync channel, controller CA having stored therein a second pseudo-random bit stream PRBS-B;
- a controller CB at Bob adapted to generate a second pseudo-random bit stream PRBS-B and send it over to Alice via the sync channel, controller CB having stored therein the first pseudo-random bit stream PRBS-A; and
- wherein controllers CA and CB are adapted to coordinate the sequential transmission of pseudo-random bit streams PRBS-A and PRBS-B from Alice to Bob and from Bob to Alice, respectively, and compare received bits to the corresponding bits in the stored pseudo-random bit stream in order to establish a sync channel error rate over the sync channel.

13. The QKD system of claim 12, wherein each controller CA and CB includes a field-programmable gate array (FPGA) adapted to generate the corresponding pseudo-random bit stream PRBS-A and PRBS-B, respectively and that has stored therein the pseudo-random bit stream generated by the other controller.

14. The QKD system of claim 12, wherein pseudo-random bit streams PRBS-A and PRBS-B are the same.

15. The QKD system of claim 12, wherein the sync channel includes an optical fiber link optically coupling Alice to Bob.

16. The QKD system of claim 15, wherein both the sync channel and a quantum channel are transmitted over the optical fiber link.

17. The system of claim 12, wherein the first pseudo-random bit stream PRBS-A is carried by a first electrical signal formed at Alice, is converted to an optical signal at Alice for transmission over to Bob, and is converted from the optical signal to a second electrical signal after being received at Bob.

18. The system of claim 12, wherein establishing a sync channel error rate includes transmitting between $10^7$ and $10^9$ bits for each pseudo-random bit stream PRSB-A and PRBS-B.

19. The system of claim 12, further comprising generating an error signal at Bob based on the sync channel error rate of transmitted pseudo-random bit stream PRSB-A.

20. In a quantum key distribution (QKD) system having first and second QKD stations Alice and Bob, a method of performing synchronization ("sync") channel comprising:
- establishing between Alice and Bob the sync channel for transmitting sync signals and a quantum channel for transmitting quantum signals;
- sending a test signal over the sync channel to establish two-way communication over the sync channel;
- generating and transmitting a first pseudo-random bit stream PRBS-A from Alice to Bob over the sync channel and storing a second pseudo-random bit stream PRBS-B at Alice;
- generating and transmitting the second pseudo-random bit stream PRBS-B from Bob to Alice over the sync channel and storing the first pseudo-random bit stream PRBS-A at Bob;
- comparing at each of Alice and Bob the respective received and stored pseudo-random bit streams to establish a sync channel error rate; and
- generating, based upon the sync channel error rate, one of a status signal indicative of sync channel verification and an error signal indicative of sync channel errors.

* * * * *